US012734839B2

(12) United States Patent
Zheng

(10) Patent No.: US 12,734,839 B2
(45) Date of Patent: Sep. 15, 2026

(54) PORTABLE PRINTER

(71) Applicant: Xiamen Hanin Electronic Technology Co. Ltd., Xiamen (CN)

(72) Inventor: Minzhi Zheng, Xiamen (CN)

(73) Assignee: Xiamen Hanin Electronic Technology Co. Ltd., Xiamen (CN)

( * ) Notice: Subject to any disclaimer, the term of this patent is extended or adjusted under 35 U.S.C. 154(b) by 112 days.

(21) Appl. No.: 18/571,677

(22) PCT Filed: Apr. 22, 2022

(86) PCT No.: PCT/CN2022/088627
§ 371 (c)(1),
(2) Date: Dec. 18, 2023

(87) PCT Pub. No.: WO2022/223043
PCT Pub. Date: Oct. 27, 2022

(65) Prior Publication Data

US 2024/0198704 A1 Jun. 20, 2024

(30) Foreign Application Priority Data

Apr. 22, 2021 (CN) ......................... 202120838406.2
Dec. 10, 2021 (CN) ......................... 202111509894.3

(51) Int. Cl.
*B41J 2/32* (2006.01)
*B41J 3/407* (2006.01)
(Continued)

(52) U.S. Cl.
CPC ................. *B41J 29/13* (2013.01); *B41J 2/32* (2013.01); *B41J 3/4075* (2013.01); *B41J 15/04* (2013.01); *B41J 25/312* (2013.01); *B41J 29/023* (2013.01)

(58) Field of Classification Search
CPC ... B41J 2/32; B41J 3/4075; B41J 15/04; B41J 29/13; B41J 3/36; B41J 25/312;
(Continued)

(56) References Cited

U.S. PATENT DOCUMENTS 4,909,645 A 3/1990 Sudo et al.
5,599,113 A 2/1997 Suzuki et al.

FOREIGN PATENT DOCUMENTS

CN 1210789 A 3/1999
CN 101352973 A 1/2009
(Continued)

OTHER PUBLICATIONS

International search report of PCT/CN2022/088627.

*Primary Examiner* — Kristal Feggins

(57) ABSTRACT

A portable printer comprises a base and a cover covering the top of the base. A print head arranged in a vertical direction and a paper feed roller provided opposite to the print head are provided in the base. The paper feed roller rotates about a first axis. The paper feed roller conveys recording paper by rotating in the state that the recording paper is clamped between the paper feed roller and the print head. An actuating rod driving the print head to be close to or away from the paper feed roller in response to an opening/closing action of the cover is provided in the base. The actuating rod is configured to swing around a second axis parallel to the first axis, and is provided with an installation part suitable for mounting the print head and a drive part suitable for being driven by the cover.

18 Claims, 11 Drawing Sheets

(51) Int. Cl.

| | |
|---|---|
| ***B41J 15/04*** | (2006.01) |
| ***B41J 25/312*** | (2006.01) |
| ***B41J 29/02*** | (2006.01) |
| ***B41J 29/13*** | (2006.01) |

(58) Field of Classification Search

CPC ...... B41J 29/023; B41J 25/304; B41J 25/308; B41J 25/3084; B41J 25/3086; B41J 25/3088; B41J 25/316

See application file for complete search history.

(56) References Cited

FOREIGN PATENT DOCUMENTS

| | | | |
|---|---|---|---|
| CN | 212171705 | U | 12/2020 |
| CN | 112571973 | A | 3/2021 |
| CN | 113334939 | A | 9/2021 |
| CN | 215397746 | U | 1/2022 |

PORTABLE PRINTER

TECHNICAL FILED

The present invention relates to the field of printers, particularly to a compactly structured, small-sized portable printer.

BACKGROUND

With the improvement of living standards, there is an increasing demand for enhanced quality of life and convenience. Consequently, the market has witnessed the emergence of label printers designed to improve life quality and convenience. These label printers can not only print text but also graphics and photos. In daily life, they can be used to print the names and expiration dates of items, assisting users in quickly locating items and reminding them of the expiration dates to ensure timely consumption and avoid items expiring due to prolonged non-use. In the realm of education, they can be employed to print students' incorrect homework, aiding students in creating a collection of mistakes. This facilitates quick recording of mistakes, reduces the time students spend transcribing error collections, thereby securing more study time and enhancing learning efficiency.

However, the existing portable printers have relatively large body dimensions, making it inconvenient to carry them in pockets. To further reduce size, an inventor has applied for Chinese Patent CN212171705U, titled "Miniature Label Printer." Nevertheless, the internal structure of this patent is overly complex, challenging to assemble, and incurs high production costs, resulting in a lack of competitiveness for the product. Therefore, there is an urgent need for a compactly structured and internally simple, easily assembled portable printer.

SUMMARY

The technical problem to be solved by the present invention is to overcome the shortcomings of the prior art and provide a compactly structured, internally simple, and easily assembled portable printer.

To achieve the above object, the technical solution adopted by the present invention is as follows:

A portable printer including a base and a cover positioned on the top of the base; the base is configured with a vertically oriented print head and a paper feed roller positioned opposite the print head, with the paper feed roller rotating around a first axis. The paper feed roller rotates by gripping the recording paper between the paper feed roller and the print head, feeding the recording paper. The base also includes an actuating rod that, in response to the opening and closing action of the cover, drives the print head closer to or away from the paper feed roller. The actuating rod is configured to pivot around a second axis parallel to the first axis and has an installation part for mounting the print head and a driving part driven by the cover. The cover has an abutment part abutted against the driving part to drive the actuating rod to pivot.

The above technical solution can be further improved as follows:

Preferably, when the cover is closed, the abutment part abuts against the driving part to drive the actuating rod to pivot, and during the pivoting process of the actuating rod, the print head approaches the paper feed roller. A force-applying component is positioned between the actuating rod and the base, exerting force on the actuating rod in a direction away from the paper feed roller. When the cover is opened, the abutment part releases the driving part, and the force-applying component drives the actuating rod to pivot, causing the print head to move away from the paper feed roller. The base has a pivot shaft extending along the second axis, and the actuating rod has a pivot hole formed thereon, the pivot hole being matched with the pivot shaft to pivotally connect the actuating rod to the base. The force-applying component is a torsion spring mounted on the pivot shaft, with at least one leg of the torsion spring connected to the actuating rod to apply force.

Preferably, the installation part forms an installation cavity, and the print head is positioned within this installation cavity. An elastic member is provided within the installation part to abut against the print head, exerting force on the print head towards the paper feed roller, allowing the gap between the print head and the paper feed roller to adapt to the thickness of the recording paper. The print head and the installation part are joined by a sliding structure, which includes sliders on the left and right sides of the print head and grooves on the left and right sides of the installation part. The bottom wall of the installation part has protrusions for supporting the print head and defining the position of the print head.

Preferably, the abutment part is formed by extending downward from the underside of the cover, and the driving part and the installation part are positioned on different sides of the actuating rod. The cover has a rotating part, and the cover is pivotally connected to the base through the rotating part, with the abutment part formed on the rotating part. The driving part is configured with a protrusion corresponding to the abutment part, and the base has a window for the driving part to extend and be pressed by the abutment part. The actuating rod has a V-shaped open back facing away from the paper feed roller.

Preferably, the base is provided with a paper roller drive device for driving the rotation of the paper feed roller. The paper roller drive device includes a drive motor and a transmission mechanism, with the drive motor mounted on one side of the open end of the actuating rod, and the central axis of the drive motor is parallel to the second axis. The base is provided with a liner plate perpendicular to the second axis, and the drive motor and transmission mechanism are respectively positioned on the upper and lower sides of the liner plate. The base is provided with a first casing, forming a first compartment between the first casing and the liner plate, where the drive motor and the actuating rod are both positioned. The base is provided with a second casing, forming a second compartment between the second casing and the liner plate, with the paper feed roller positioned in the second compartment, and the two ends of the paper feed roller are rotatably connected to the second casing and the liner plate, respectively.

Preferably, the liner plate has a recessed groove in the swing region of the print head, increasing the vertical accommodation height along the swing direction of the print head. The first casing has an upwardly-protruding groove in the swing region of the print head, increasing the vertical accommodation height along the swing direction of the print head.

Preferably, the base is provided with a first casing and a second casing, with the actuating rod positioned in the first casing and the paper feed roller positioned in the second casing. A paper gap for paper feeding is formed between the first casing and the second casing. The base has a casing forming its bottom wall and side walls, and the side walls of the first casing, the second casing, and the casing together enclose a paper compartment for installing a roll of recording paper. The cover includes an inner cover and an outer cover, with the inner cover having a limit part to restrict upward movement of the roll of recording paper.

Preferably, the base is provided with a liner plate, forming a third compartment between the liner plate and the bottom wall of the casing, where the third compartment accommodates a battery. The battery is a rechargeable battery, and the third compartment is provided with a circuit board, with a partition board arranged between the circuit board and the battery.

Due to the adoption of the above technical solution, the present invention has the following advantages:

In the process of closing the cover, the cover of the present invention directly drives the actuating rod to pivot, thereby moving the print head closer to the paper feed roller. In the process of opening the cover, the cover gradually releases the actuating rod, causing the print head to move away from the paper feed roller. The compact size of the printer in this invention makes it easy to carry, and its internally well-organized and compact structure is easy to assemble, significantly improving production efficiency and reducing failure rates. Compared to prior art, there are fewer transmission structures, resulting in a smaller footprint, more stable transmission, and lower failure rates.

Additionally, the paper compartment of the present invention is enclosed by a casing and two casings, providing a larger volume that can accommodate more recording paper. This extends the period for users to replace recording paper, saving on operational costs.

BRIEF DESCRIPTION OF THE DRAWINGS

To provide a clearer understanding of the technical solutions in the embodiments of the present invention, a brief introduction to the accompanying drawings of the embodiments will be provided below. It is evident that the drawings in the following description only pertain to some embodiments of the present invention and are not limiting to the invention.

REFERENCE NUMERALS IN THE DRAWINGS

Figure 1:
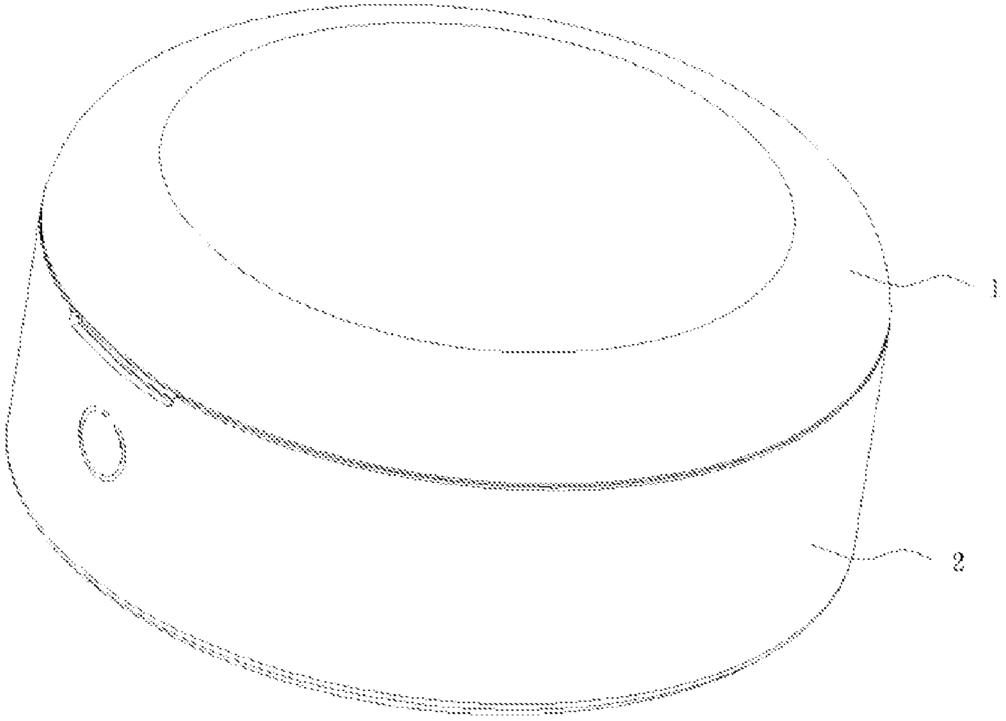
FIG. 1 is a schematic diagram of the closed state of the portable printer in Embodiment one.

1. Cover; 101. Inner cover; 101*a*. Abutment part; 101*b*. Limit part; 102. Outer cover; 2. Base; 201. First casing; 201*a*. Window; 201*b*. Upwardly-protruding groove; 202. Second casing; 203. Casing; 203*a*. Guide-limiting plate; 204. Paper compartment; 205. Liner plate; 205*a*. Notch groove; 205*b*. Recessed groove; 206. Battery; 207. Circuit board; 208. Partition board; 209. Paper feed roller; 210. Motor; 211. Transmission mechanism; 212. Force-applying component; 213. Pivot shaft; 4. Actuating rod; 401. Driving part; 5. Print head; 6. Elastic member.

DETAILED DESCRIPTION OF THE EMBODIMENTS

To provide a clearer explanation of the purpose, technical solutions, and advantages of the embodiments of the present invention, a detailed description of the embodiments will be given below in conjunction with the drawings. Generally, the components of the embodiments described and illustrated in the drawings can be arranged and designed in various configurations. Based on the embodiments in the present invention, all other embodiments obtained by those skilled in the art without creative work are within the scope of the present invention's protection.

It should be noted that, unless otherwise explicitly specified and limited, the technical terms or scientific terms used in this patent document should be understood in the general sense by those skilled in the art within the field of the present invention. The terms "first," "second," and similar terms used in this patent document, as well as the like, do not indicate any order, quantity, or importance, but are used to distinguish different components. Similarly, terms such as "one," "a," or "the" do not indicate a quantity limitation but merely indicate existence of at least one. "Including" or "comprising" and similar terms mean including the elements or objects preceding the term "including" or "comprising" and also including the elements or objects listed after the term "including" or "comprising," as well as their equivalents. Terms such as "center," "up," "down," "left," "right," "vertical," "horizontal," "inner," "outer," and the like are used to indicate relative positional relationships. When the absolute position of the described object changes, the relative positional relationship may also change accordingly. These terms are used for ease of describing the present invention and simplifying the description, and do not indicate or imply that the device or component referred to must have a specific orientation, construction, or operation in that specific orientation.

In the description of the present invention, it should be noted that, unless otherwise expressly specified and limited, the terms "installation," "connection," "linking" should be broadly understood. For example, it can be a fixed connection, a detachable connection, or an integral connection; it can be a mechanical connection or an electrical connection; it can be a direct connection or an indirect connection through an intermediate medium, and can be a communication inside two components. For those skilled in the art in this field, the specific meanings of the above terms used in the present invention can be understood according to specific situations.

Below, in conjunction with the drawings, some embodiments of the present invention will be further described. Unless conflicting, the features in the following embodiments can be combined with each other.

Embodiment One

In this embodiment, a portable printer is provided, as shown in FIGS. 1-9. The portable printer includes a base 2 and a cover 1 covering the top of the base. Inside the base 2 are arranged along the vertical direction a print head 5 and a paper feed roller 209, which is positioned opposite the print head 5. The paper feed roller 209 rotates around a first axis. The vertical direction refers to the extension direction of the print head 5 when the printer is placed on a horizontal surface, i.e., the height direction of the printer. The paper feed roller 209 rotates by gripping the recording paper between the print head 5 and the paper feed roller 209. Inside the base 2 is also an actuating rod 4, which is driven in response to the opening and closing actions of the cover 1 to move the print head 5 closer to or away from the paper feed roller 209. The actuating rod 4 is configured to swing around a second axis parallel to the first axis, with the first and second axes being two vertically positioned axes. The actuating rod 4 has an installation part for mounting the print head 5 and a drive part 401 protruding from the base 2 and driven by the cover 1. The cover 1 has an abutment part 101*a* capable of pressing the drive part 401 to drive the actuating rod 4 to swing. The abutment part 101*a* is located on the inner side of the cover 1 and is not visible after the cover is closed. The clamping force between the print head 5 and the paper feed roller 209 comes from the holding force of the cover 1 on the actuating rod 4.

It should be noted that the print head 5 in this embodiment is a thermal print head, including a thermal element and a print head bracket for mounting the thermal element. Correspondingly, the recording paper is also thermal paper. However, this does not constitute a limitation on the present utility model. In other embodiments, other types of print heads can be used.

Figure 5:
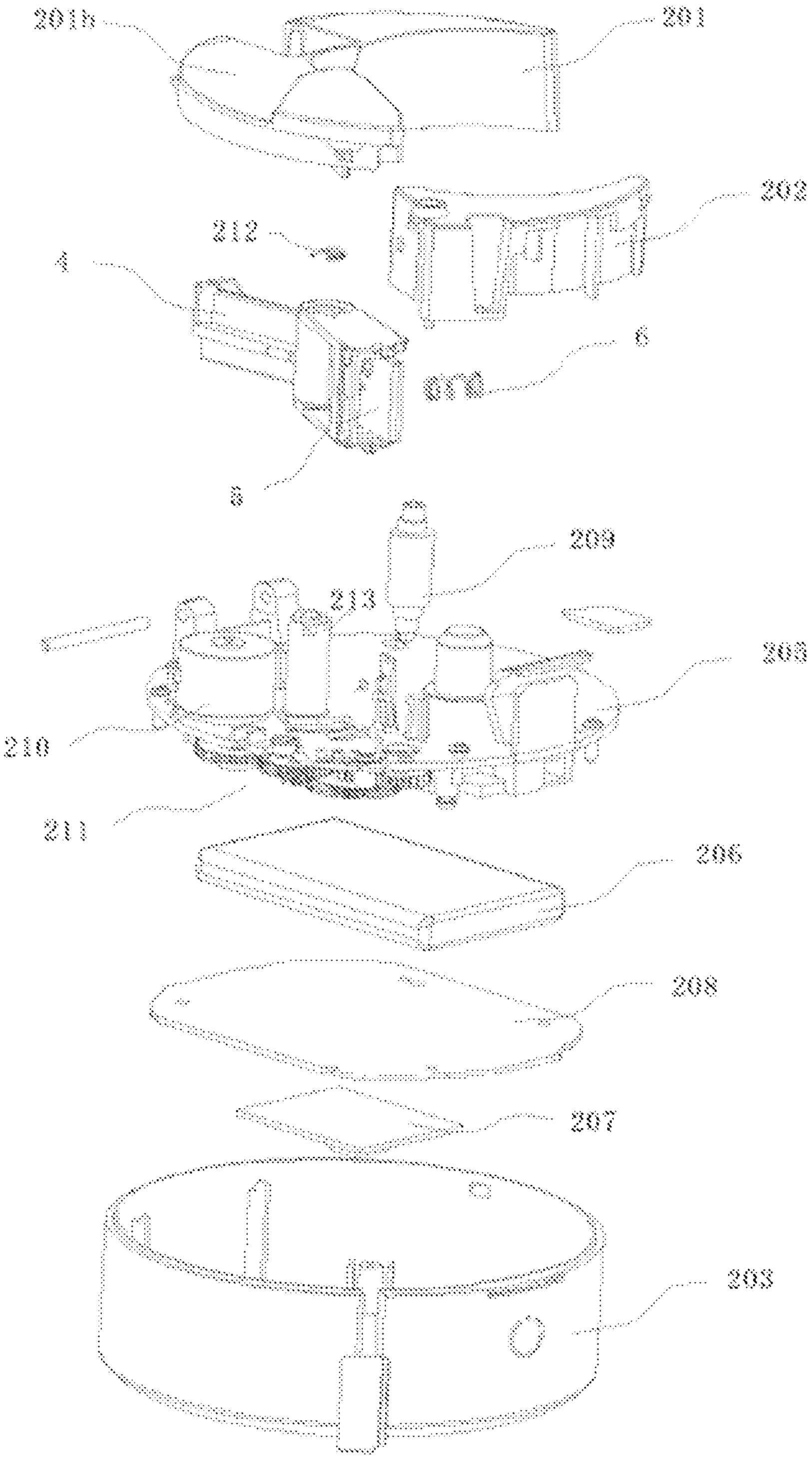
FIG. 5 is an exploded view of the base in Embodiment one.
Figure 6:
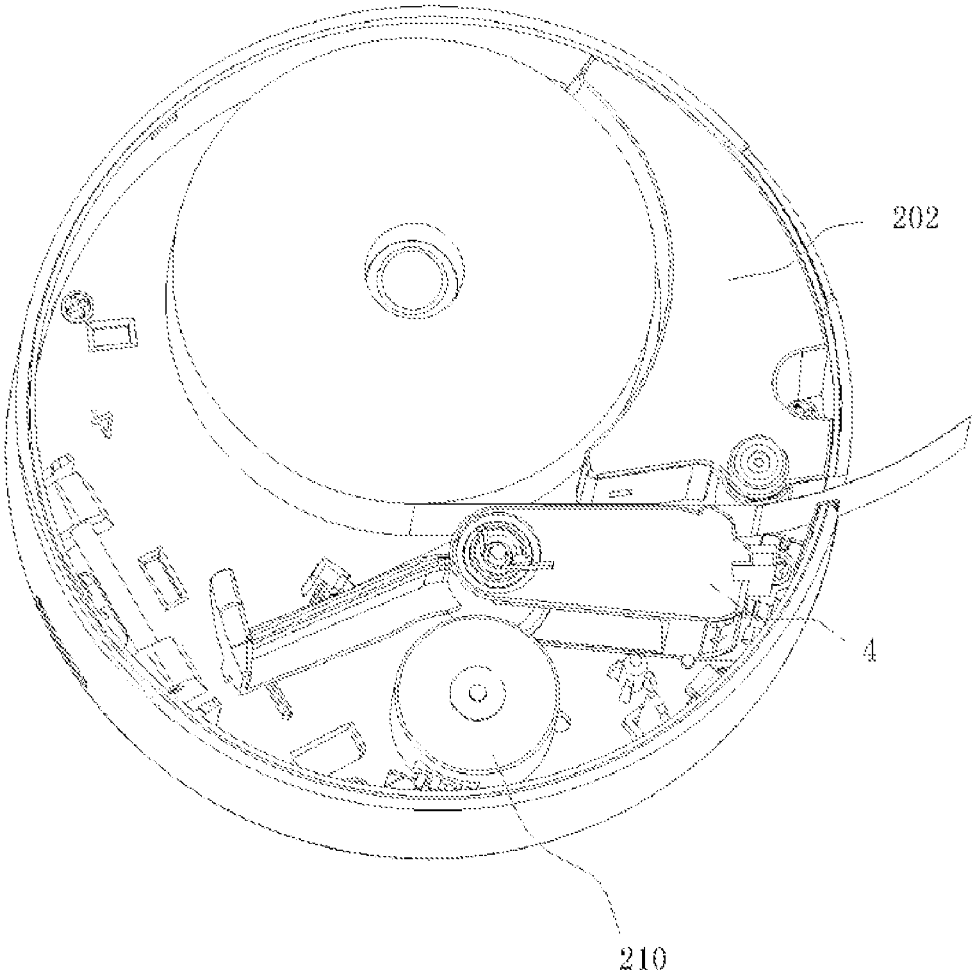
FIG. 6 is an internal structural view of the base in Embodiment one.

As shown in FIGS. 5 and 6, when the cover 1 is closed, the abutment part 101*a* presses the drive part 401 to drive the actuating rod 4 to swing. During the swing of the actuating rod 4, the print head 5 gradually approaches the paper feed roller 209. Between the actuating rod 4 and the base 2, a force-applying component 212 is arranged. The force-applying component 212 is configured to apply force to the actuating rod 4 in the direction of moving the print head 5 away from the paper feed roller 209. When the cover 1 is opened, the abutment part 101*a* gradually releases the drive part 401. The force-applying component 212 drives the actuating rod 4 to swing, and during the swing of the actuating rod 4, the print head 5 moves away from the paper feed roller 209. The base 2 has a pivot shaft 213 extending along the second axis. The actuating rod 4 has a pivot hole formed on it, and the pivot hole and the pivot shaft 213 are matched to pivotally connect the actuating rod 4 to the base 2. The force-applying component 212 is a torsion spring mounted on the pivot shaft 213. The torsion spring has at least one leg connected to the actuating rod 4 to apply force to the actuating rod 4. Specifically, the top of the pivot shaft 213 has a notch, and the body of the torsion spring is fixed in the notch. The torsion spring has two legs, one leg is fixed on the pivot shaft 213, and the other leg is fixed on the actuating rod 4 to apply force to the actuating rod 4. This arrangement ensures that the actuating rod 4 can return to its initial position after losing the force of the cover 1. After opening the cover 1, the gap between the print head 5 and the paper feed roller 209 reaches its maximum, facilitating the user to take out the recording paper for replacement.

It should be noted that in other embodiments, the force-applying component 212 can also be selected as a spring or a leaf spring. If a spring or a leaf spring is used as the force-applying component 212, it can be placed near the drive part 401 or the mounting part of the actuating rod 4. In the case of using a spring or a leaf spring as the force-applying component 212, it is necessary for the abutment part 101*a* to overcome the elastic force of the spring or the leaf spring to drive the actuating rod 4 to swing. It can be understood that using a torsion spring as the force-applying component 212, in this embodiment, is an optimal way. On the one hand, the torsion spring is placed in the pivot hole, covering the pivot shaft 213 without occupying additional space inside the base 2. On the other hand, since the movement of the actuating rod 4 is a swing, the torsion spring can adapt better to the swing motion, reducing the occurrence of failures and damages, and minimizing the frequency of malfunctions.

Figure 2:
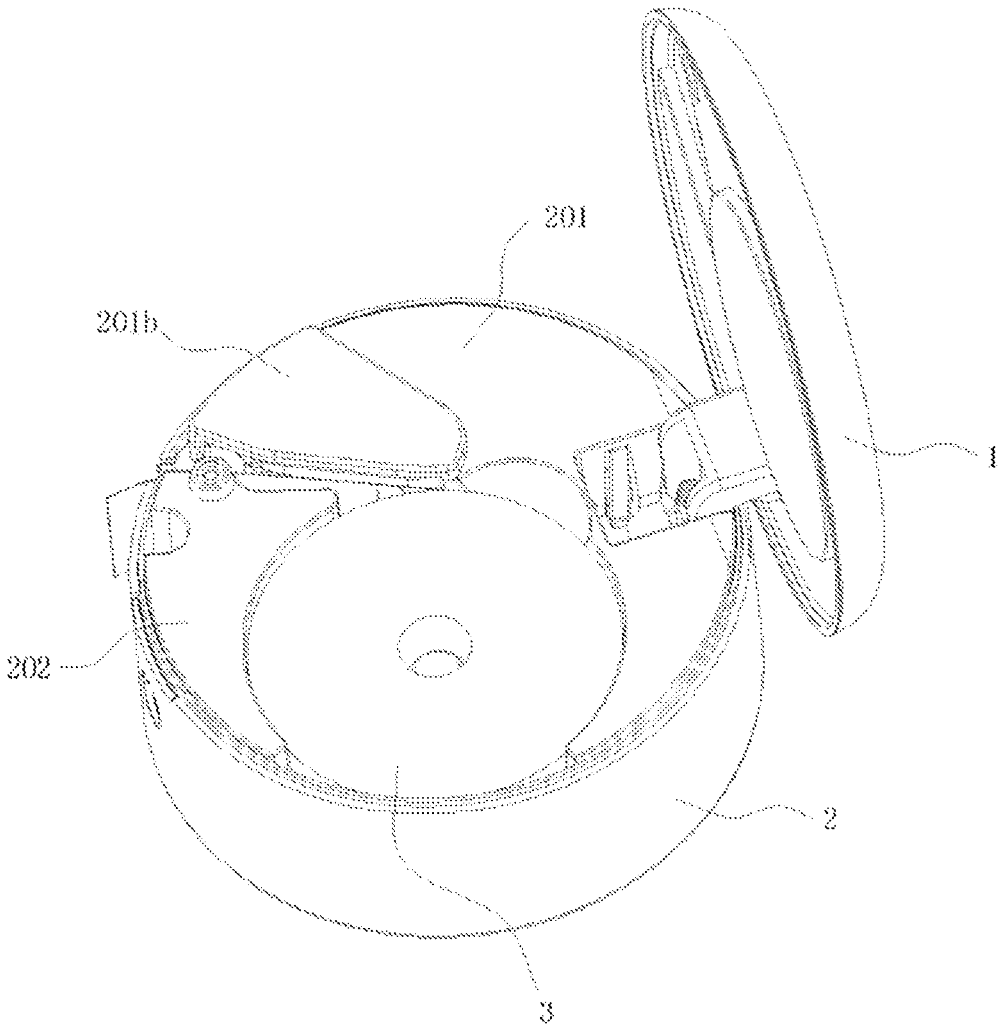
FIG. 2 is a schematic diagram of the open state of the portable printer in Embodiment one.

Furthermore, the cover 1 is pivotally connected to the base 2 via a pivot shaft, and an opening spring is fitted on the pivot shaft. The first leg of the opening spring abuts against the base 2, and the second leg abuts against the cover 1. The body part of the opening spring is fitted on the pivot shaft. During the closing process, the abutment part 101*a* of the cover 1 presses the drive part 401, causing the actuating rod 4 to swing around the second axis. During the swing of the actuating rod 4, the print head 5 gradually approaches the paper feed roller 209. When the print head 5 abuts against the paper feed roller 209, the two together grip the recording paper, and the motor 210 drives the paper feed roller 209 to rotate through the transmission mechanism 211, thereby feeding the recording paper. During the opening process, the abutment part 101*a* gradually releases the drive part 401, and the actuating rod 4 reverses under the action of the force-applying component 212, making the print head 5 move away from the paper feed roller 209. FIG. 1 shows the closed state of the printer, and FIG. 2 shows the open state of the printer.

It should be noted that, in other embodiments, the force-applying component 212 can also be a spring or a leaf. If a spring or a leaf is chosen as the force-applying component 212, it can be positioned near the drive part 401 on the actuating rod 4 or near the installation part. In this case, the abutment part 101*a* needs to overcome the elasticity of the spring or leaf when it exerts pressure on the drive part 401 to drive the actuating rod 4 to swing. However, it is to be understood that, in this embodiment, the use of a torsion spring as the force-applying component 212 is considered optimal. On one hand, the torsion spring is accommodated in the pivot hole and mounted on the pivot shaft 213 without requiring additional space within the base 2. On the other hand, due to the swinging motion of the actuating rod 4, the torsion spring is better suited to adapt to the swinging motion, making it less prone to failure or damage and reducing the frequency of malfunctions.

Furthermore, the cover 1 is pivotally connected to the base 2 via a pivot shaft and is provided with an opening torsion spring on the pivot shaft. The first leg of the opening torsion spring abuts against the base 2, while the second leg abuts against the cover 1, and the main body is fitted on the pivot shaft. During the closing process, the abutment part 101*a* on the cover 1 abuts against the drive part 401 of the actuating rod 4, causing the actuating rod 4 to swing around the second axis. During the swinging motion of the actuating rod 4, the print head 5 gradually approaches the paper feed roller 209. When the print head 5 abuts against the paper feed roller 209, they grip the recording paper, and the motor 210 drives the paper feed roller 209 to rotate through the transmission mechanism 211, thereby feeding the recording paper. During the opening process, the abutment part 101*a* of the actuating rod 4 gradually releases the drive part 401, and the actuating rod 4 reverses under the action of the force-applying component 212, causing the print head 5 to move away from the paper feed roller 209. FIG. 1 shows the closed state of the printer, and FIG. 2 shows the open state of the printer.

Compared with the actuating mechanisms used to drive the print head closer or away from the paper feed roller in the prior art, the structure of the actuating rod in this application is simpler, requires fewer transmission mechanisms, and does not require multiple transmissions or the use of numerous elastic elements to drive the actuating mechanism to reset. Therefore, the actuating rod structure in the portable printer provided in this embodiment is simpler, more direct, and occupies less space, better meeting the requirements for miniaturization and portability. Furthermore, due to the fewer transmission mechanisms, the occurrence of malfunctions is reduced, making it less susceptible to damage, and facilitating later maintenance and replacement.

Figure 7:
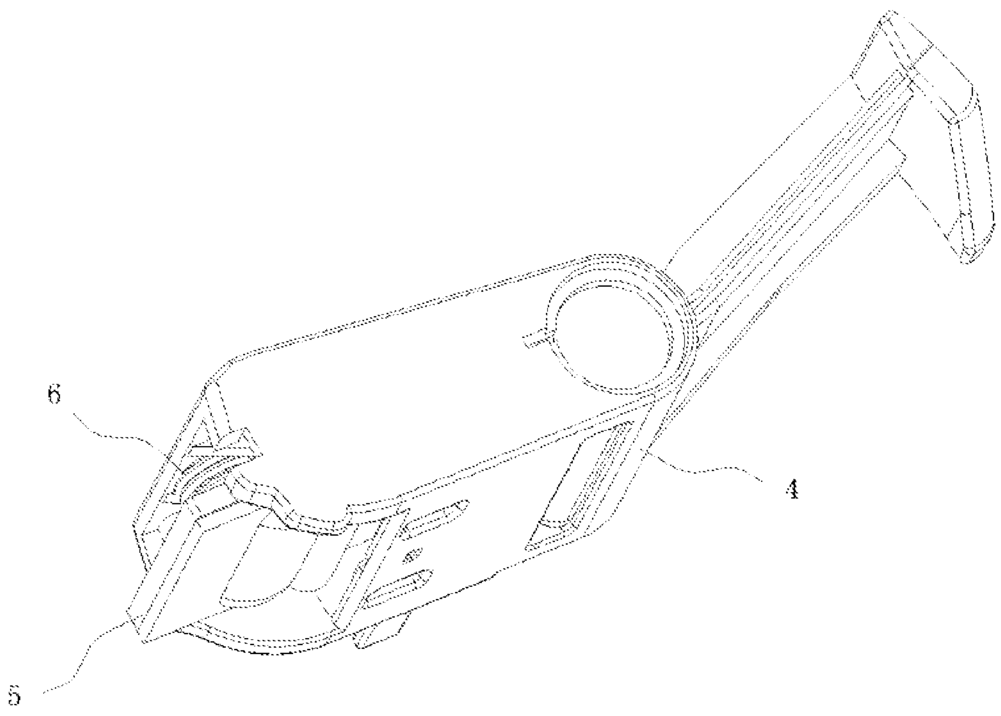
FIG. 7 is an assembly view of the actuating rod and print head in Embodiment one.
Figure 8:
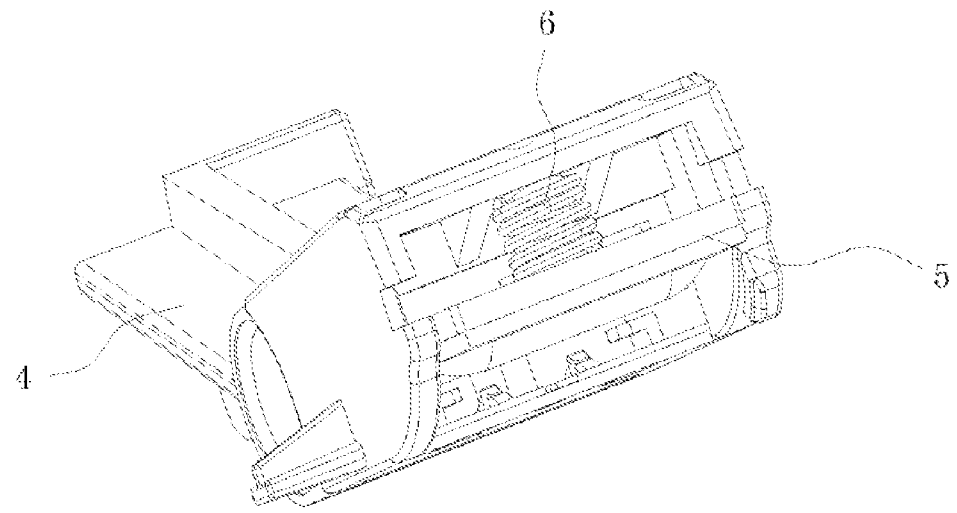
FIG. 8 is another assembly view of the actuating rod and print head in Embodiment one.

As shown in FIGS. 7 and 8, the installation part of the actuating rod 4 forms a mounting cavity, and the print head 5 is positioned in the mounting cavity. The mounting cavity is a recess formed by the end of the actuating rod 4 protruding inwardly. The end of the actuating rod 4 has an opening, and the print head 5 is loaded into the mounting cavity through the opening. The installation part is provided with a cylindrical spring 6 as the elastic component, which exerts force on the print head 5 towards the direction closer to the paper feed roller 209. This allows the gap between the print head 5 and the paper feed roller 209 to adapt to the thickness of the recording paper when the print head 5 abuts against the paper feed roller 209, accommodating a wider range of paper thicknesses. This design prevents difficulties in passing through the gap between the print head 5 and the paper feed roller 209 when the paper is thicker, namely, the paper path.

In this embodiment, the print head 5 is connected to the installation part by a sliding structure, allowing the print head 5 to move up and down within the mounting cavity. The sliding structure includes sliders arranged on the left and right sides of the print head 5 and grooves arranged on the left and right side walls of the installation part. The sliders on both sides extend into the grooves, and the sliders and the print head 5 bracket are integrally arranged, enabling up and down movement within the grooves. The bottom wall of the installation part is provided with a limiting projection for supporting the print head 5 and defining its position. The limiting projection is located at the tail of the print head 5 bracket, and together with the paper feed roller 209, it forms a stable support for the print head 5.

Furthermore, to achieve a compact structure, the actuating rod 4 is configured with an open end in a slightly V-shaped manner, facing away from the paper feed roller 209, as shown in FIGS. 6-8. The installation part is located at one end of the actuating rod 4, close to the paper feed roller 209, while the drive part 401 is located at the other end of the actuating rod 4, away from the paper feed roller 209. The drive part 401 extends laterally from the rod of the actuating rod 4, and the second axis is located at the bend in the actuating rod 4, i.e., the installation part and the drive part are on different sides of the actuating rod relative to the second axis. Specifically, the base 2 is provided with a pivot shaft 213 extending along the second axis, and a pivot hole is formed at the bend in the actuating rod 4. The pivot hole and the pivot shaft 213 are matched to pivotally connect the actuating rod 4 to the base 2. The cover 1 has a rotating part, and the base 2 has a pivot, allowing the cover 1 to pivotally engage with and cover the base 2. An abutment part 101*a*, which abuts against the drive part 401, is formed on the rotating part, and the drive part is provided with a protrusion that corresponds to the abutment part.

As shown in FIGS. 5 and 6, the base 2 is provided with a paper roller driving device for rotating the paper feed roller 209. The paper roller driving device includes a drive motor 210 and a transmission mechanism 211. The drive motor 210 is mounted on one side of the open end of the actuating rod 4, and the central axis of the drive motor 210 is parallel to the second axis. The base 2 is configured with a liner plate 205, perpendicular to the second axis, and the drive motor 210 and the transmission mechanism 211 are respectively positioned on the upper and lower sides of the liner plate 205. Specifically, the transmission mechanism 211 includes multiple gears that mesh with each other. In other embodiments, it can be another transmission mechanism, such as a belt drive mechanism 211. The motor 210 can transmit power to the paper feed roller 209 through the transmission mechanism 211, causing the paper feed roller 209 to rotate. The rotation of the paper feed roller 209 can drive the movement of the recording paper, achieving paper feed. Placing the motor 210 and the transmission mechanism 211 on the upper and lower sides of the liner plate 205 helps make the overall structure more compact.

Figure 4:
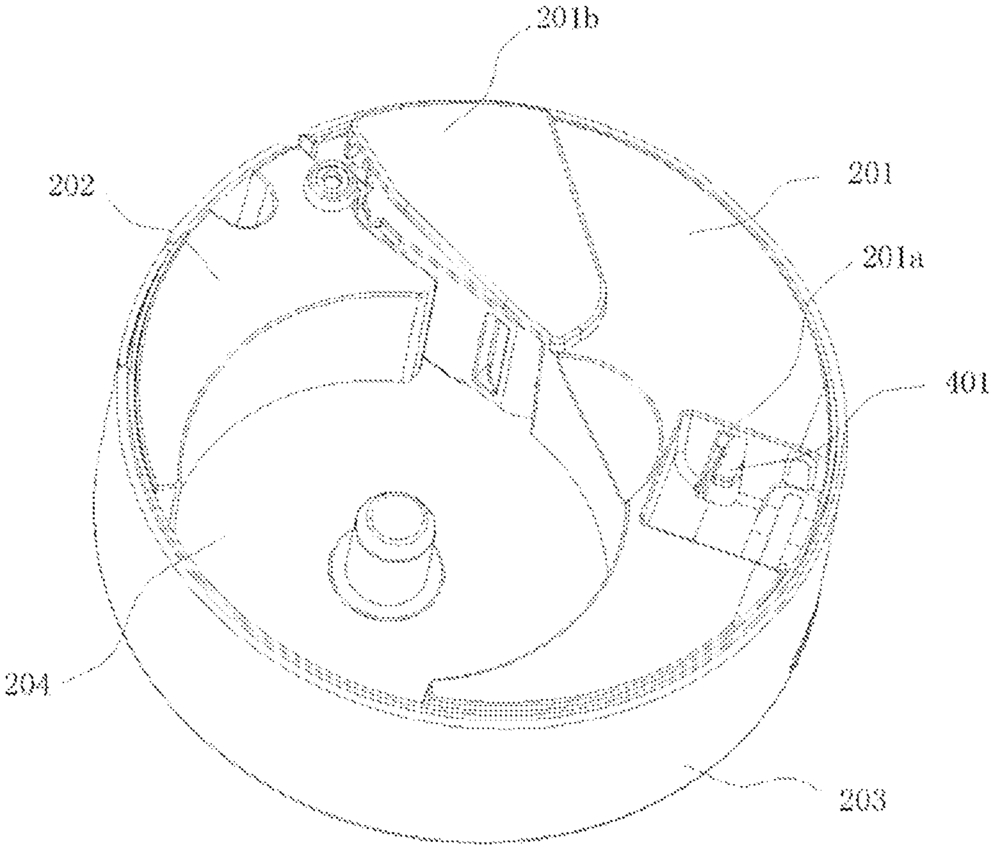
FIG. 4 is a structural view of the base in Embodiment one.

As shown in FIG. 4, the base 2 is provided with a first casing 201, forming a first compartment between the first casing 201 and the liner plate 205. Both the drive motor 210 and the actuating rod 4 are configured within this first compartment. The base 2 is also provided with a second casing 202, forming a second compartment between the second casing 202 and the liner plate 205. The paper feed roller 209 is located within this second compartment, with its two ends rotatably attached to the second casing 202 and the liner plate 205, respectively. The configuration mentioned above is beneficial for making the overall structure compact. In this embodiment, the outer casing 203 has a bottomed cylindrical structure, and the liner plate 205 is inserted into the top opening of the outer casing 203. The first casing 201 and the second casing 202 are detachably mounted on the liner plate 205.

Referring to FIG. 4, the base 2 is provided with downward-opening first and second casings 201 and 202, which are secured to the liner plate 205. The actuating rod 4 is located within the first casing 201, and the paper feed roller 209 is situated in the second casing 202. A paper feed gap, used for guiding the paper, is formed between the first casing 201 and the second casing 202, with the print head 5 and the paper feed roller 209 positioned on either side of the paper feed gap. The base 2 has an outer casing 203 forming the bottom wall and side walls. The side walls of the first casing 201, the second casing 202, and the outer casing 203 collectively define a paper storage bin 204 for accommodating paper rolls. This paper compartment 204, by its structural design, maximizes its volume for holding more recording paper while keeping the structure simple for easy installation.

Figure 3:
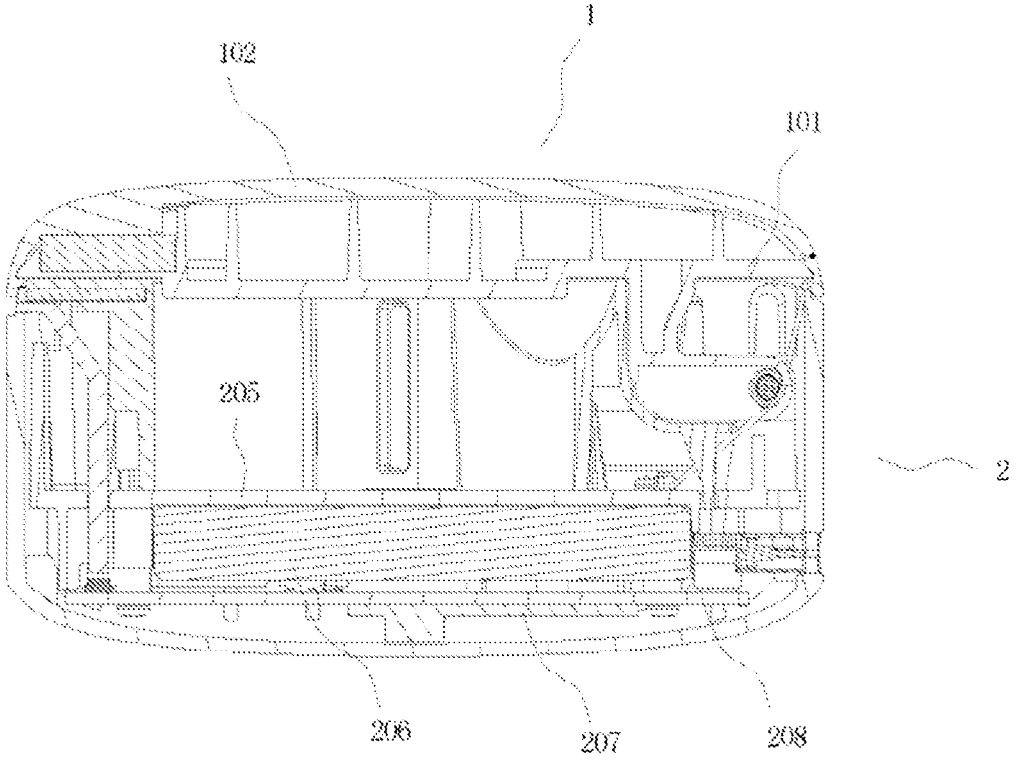
FIG. 3 is a sectional view of the portable printer in Embodiment one.

As shown in FIGS. 3 and 5, the base 2 is provided with a liner plate 205, forming a third compartment between the liner plate 205 and the bottom wall of the outer casing 203. This third compartment houses a rechargeable battery 206 and a circuit board 207. Specifically, the rechargeable battery 206 is positioned in the third compartment, and a partition 208 is arranged between the circuit board 207 and the rechargeable battery 206. The partition 208 prevents heat generated by the battery 206 during operation from transferring to the circuit board 207, ensuring the normal operation of the circuit board 207. The partition 208 is fixed to the liner plate 205 by screws, and both the battery 206 and the circuit board 207 are secured to the liner plate 205, providing stability.

Figure 9:
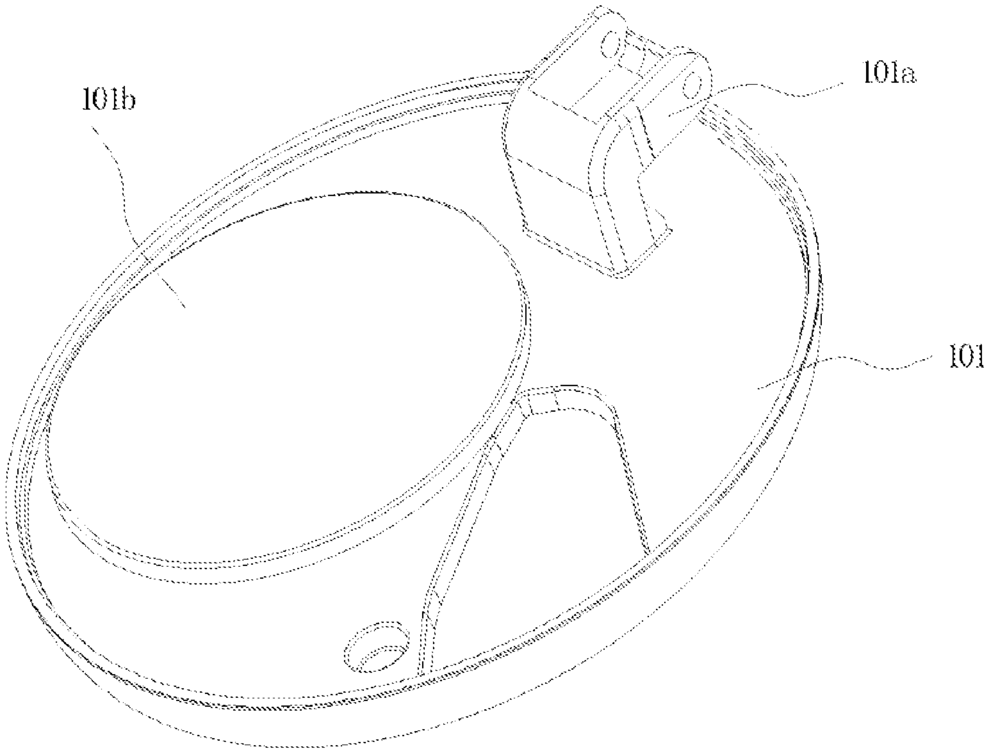
FIG. 9 is a structural view of the cover in Embodiment one.

As shown in FIGS. 3 and 9, the cover 1 includes an inner cover 101 and an outer cover 102. The inner cover 101 is provided with a limiting part 101*b* to prevent the paper roll from upward movement and avoid paper jamming issues during printing.

Figure 10:
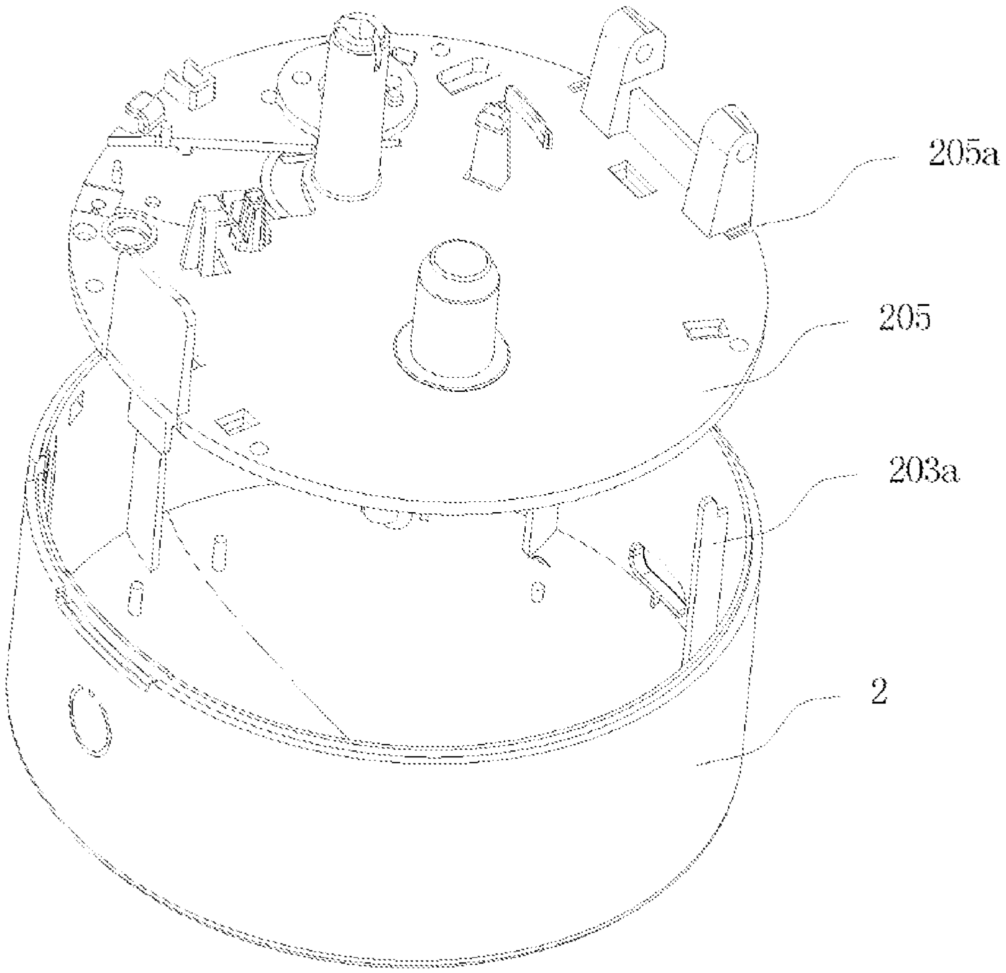
FIG. 10 is an exploded view of the liner plate and base in Embodiment one.

As shown in FIG. 10, for easy assembly of the liner plate 205, guide-limiting plates 203*a* are provided on the inner side walls of the seat in the vertical direction of the printer. Corresponding notched grooves 205*a* are formed on the liner plate 205. These guide-limiting plates 203*a* and notched grooves 205*a* cooperate to guide the liner plate into the casing and limit its position horizontally during assembly. When assembling the liner plate, aligning the notched grooves on the liner plate with the guide-limiting plates on the seat allows the liner plate to be inserted, preventing horizontal movement of the liner plate once assembled.

Figure 11:
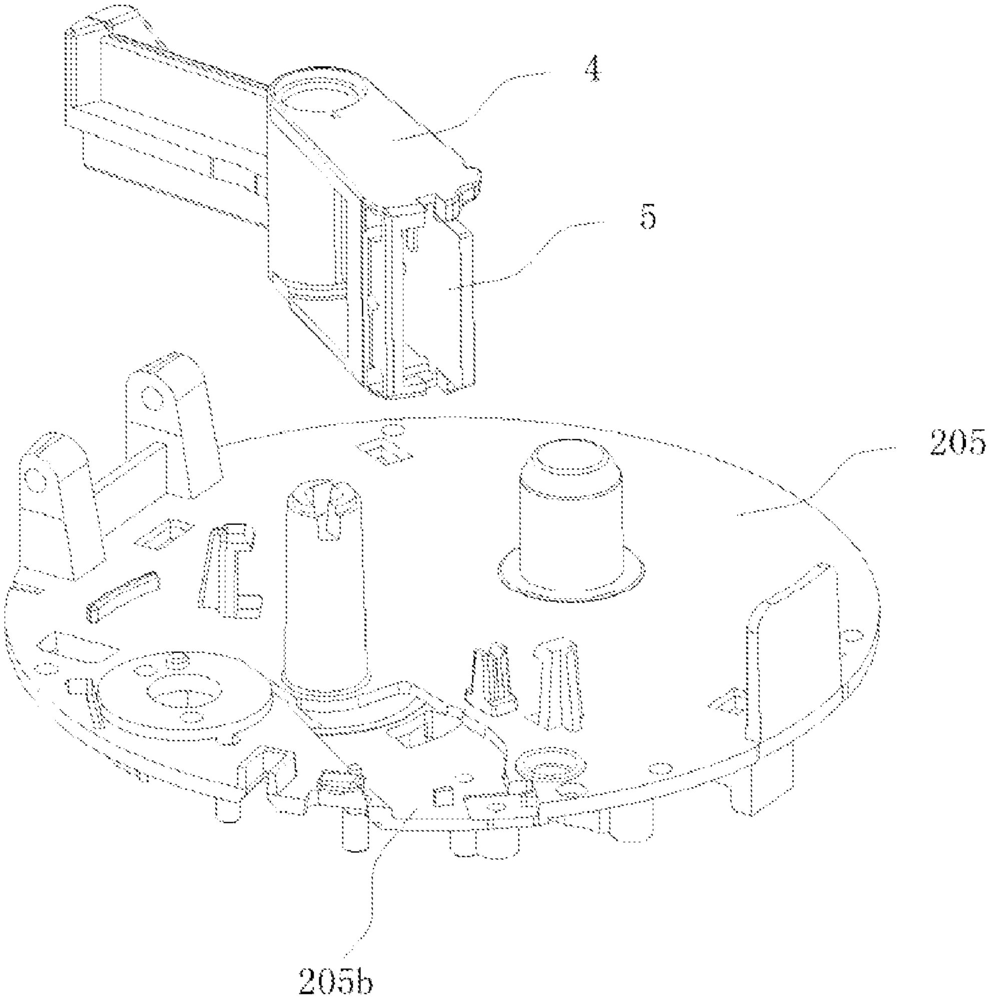
FIG. 11 is an exploded view of the actuating rod and liner plate in Embodiment one.

As shown in FIG. 11, to further reduce the overall thickness of the printer, recessed grooves 205*b* are provided on the liner plate within the swing area of the print head. This increases the vertical accommodation height within the swing area of the print head, reducing the thickness of the liner plate itself in the specified region. Additionally, in combination with FIGS. 2, 4, and 5, the first casing 201 has an upwardly-protruding groove 201*b* within the swing area of the print head, further increasing the vertical accommodation height within the swing area of the print head. This provides additional space to reduce the overall thickness of the printer, given the specified length of the print head. Moreover, a detecting switch is placed on the actuating rod 4, with a triggering component situated inside the second casing 202. Alternatively, a detecting switch can be placed inside the second casing 202, with a triggering component on the actuating rod 4. When the print head 5 approaches the paper feed roller 209, the triggering component triggers the detecting switch, generating an electrical signal. The triggering component can be a magnet, and the detecting switch can be a Hall element. When the print head 5 is close to the paper feed roller 209, the magnet triggers the Hall element to produce an electrical signal, serving to determine whether the cover is closed and whether the gap between the print head 5 and the paper feed roller 209 is suitable for printing, avoiding wasting recording paper.

Moreover, a detection device for detecting the presence of recording paper in the paper feed channel can be set up. The detection device can be two opposing infrared sensors. When there is paper in the paper feed channel, the recording paper blocks the infrared light emitted by the infrared emitter, preventing the infrared receiver from receiving the infrared light and indicating the presence of paper.

Furthermore, to determine the open or closed state of the cover 1, magnets can be arranged on the cover 1, and Hall elements can be arranged on the inner side of the second casing 202. When the cover 1 is in the closed state, the magnet triggers the Hall element, and the control device determines the closed state. When the cover 1 is in the open state, the magnet is away from the Hall element, and the Hall element is in the disconnected state, allowing the control device to determine the open state.

The operational process of the present invention is as follows:

During use, open the cover 1, insert the paper roll of the recording paper into the paper compartment 204. At this time, the gap between the print head 5 and the paper feed roller 209 is maximized, allowing the recording paper to be drawn out of the paper feed channel. Close the cover 1, and during the closing process, the abutment part 101*a* on the cover 1 abuts against the drive part 401, causing the actuating rod 4 to rotate, bringing the print head 5 closer to the paper feed roller 209. The recording paper is then clamped between them. When the drive motor 210 rotates the paper feed roller 209, printing is performed while simultaneously advancing the recording paper. After printing is complete, the user can cut the recording paper at the opening of the paper feed channel using a cutter. When the paper is out in the paper compartment 204, open the cover 1 for replacement.

The above description is only an embodiment of the present invention, and the scope of protection of the present invention is not limited to this. Any changes or substitutions that can be easily conceived by those skilled in the art within the technical scope disclosed in the present invention should be covered within the protection scope of the present invention. Therefore, the protection scope of the present invention should be determined based on the scope of the claims.

The invention claimed is:

1. A portable printer comprising a base and a cover positioned atop the base; the base is provided with:
- a vertically oriented print head, and
- a paper feed roller, positioned opposite the print head, rotating about a first axis;
- the paper feed roller is rotated to advance a recording paper by gripping the recording paper between the paper feed roller and the print head;
- the base further comprises an actuating rod, in response to the opening and closing motion of the cover, driving the print head towards or away from the paper feed roller;
- wherein, the actuating rod is configured to pivot about a second axis parallel to the first axis, having an installation part for mounting the print head and a drive part actuated by the cover, and
- the cover has an abutment part capable of abutting against the drive part to drive the actuating rod to pivot;
- wherein an installation cavity is formed within the installation part, and the print head is positioned within the installation cavity.

2. The portable printer according to claim 1, wherein when the cover is closed, the abutment part presses the drive part to drive the actuating rod to pivot, and during the pivot of the actuating rod, the print head approaches the paper feed roller.

3. The portable printer according to claim 1, wherein, a force-applying component is arranged between the actuating rod and the base, configured to apply force to the actuating rod in a direction away from the paper feed roller when activated.

4. The portable printer according to claim 3, wherein when the cover is opened, the abutment part releases the drive part, and the force-applying component drives the actuating rod to pivot; during the pivot of the actuating rod, the print head moves away from the paper feed roller.

5. The portable printer according to claim 3, wherein the base has a pivot shaft extending along the second axis, and the actuating rod is provided with a pivot hole, the pivot hole and the pivot shaft being matched to pivotally connect the actuating rod to the base.

6. The portable printer according to claim 5, wherein the force-applying component is a torsion spring mounted on the pivot shaft, with at least one leg of the torsion spring connected to the actuating rod to apply force.

7. The portable printer according to claim 1, wherein-the installation part is provided with an elastic element for abutting against the print head, the elastic element applying force to the print head in a direction towards the paper feed roller, ensuring a gap between the print head and the paper feed roller adapt to the thickness of the recording paper.

8. The portable printer according to claim 7, wherein the print head and the installation part are joined by a sliding structure, including sliders on the left and right sides of the print head and grooves on the left and right walls of the installation part.

9. The portable printer according to claim 8, wherein the installation part has a bottom wall with a limiting protrusion for supporting and defining the position of the print head.

10. The portable printer according to claim 1, wherein the abutment part extends downward from the underside of the cover; the drive part and installation part are positioned on different sides of the actuating rod;

the cover has a rotating part, the cover being pivotally connected to the base through the rotating part, and the abutment part is formed on the rotating part;

the drive part is configured as a protrusion compatible with the abutment part, and the base has a window allowing the drive part to extend for the pressing action of the abutment part;

the actuating rod is V-shaped with an open facing away from the paper feed roller;

the base is provided with a paper feed drive device for driving the rotation of the paper feed roller, the paper feed drive device comprising a drive motor and a transmission mechanism, the drive motor being installed on the open side of the actuating rod, and the central axis of the drive motor being parallel to the second axis;

the base comprises a linear plate perpendicular to the second axis, with the drive motor and transmission mechanism arranged on the upper and lower sides of the linear plate, respectively;

the base is provided with a first casing, forming a first compartment between the first casing and the linear plate, with the drive motor and actuating rod both positioned within the first compartment.

11. The portable printer according to claim 1, wherein the base is provided with a second casing, forming a second compartment between the second casing and the linear plate, with the paper feed roller positioned within the second compartment, and both ends of the paper feed roller being rotatably coupled to the second casing and the linear plate, respectively.

12. The portable printer according to claim 1, wherein the linear plate has a recessed groove in the swing area of the print head, increasing the containment height along the vertical direction in the swing area of the print head.

13. The portable printer according to claim 1, wherein the first casing protrudes upward in the swing area of the print head, forming an upwardly-protruding groove to increase the containment height along the vertical direction in the swing area of the print head.

14. The portable printer according to claim 1, wherein the base is provided with a first casing and a second casing, the actuating rod positioned within the first casing, the paper feed roller positioned within the second casing, and a paper feed gap for paper passage formed between the first casing and the second casing.

15. The portable printer according to claim 14, wherein the base has an outer casing forming bottom and side walls of the base; the side walls of the first casing, second casing, and outer casing together enclose a paper compartment for installing a recording paper roll.

16. The portable printer according to claim 15, wherein the base comprises a linear plate, forming a third compartment between the linear plate and the bottom wall of the outer casing, with the third compartment housing a battery.

17. The portable printer according to claim 16, wherein the battery is a rechargeable battery, and the third compartment houses a circuit board, with a partition board arranged between the circuit board and the battery.

18. The portable printer according to claim 15, wherein the cover comprises an inner cover and an outer cover, with the inner cover having a limit part to restrict upward movement of the recording paper roll.

* * * * *